(12) United States Patent
Tsunekawa et al.

(10) Patent No.: US 11,061,248 B2
(45) Date of Patent: Jul. 13, 2021

(54) NONCONTACT OPERATION DETECTING DEVICE

(71) Applicants: TOYODA GOSEI CO., LTD., Kiyosu (JP); UTSUNOMIYA UNIVERSITY, Utsunomiya (JP)

(72) Inventors: Yuichi Tsunekawa, Kiyosu (JP); Kazuhito Kawamura, Kiyosu (JP); Hirotsugu Yamamoto, Utsunomiya (JP)

(73) Assignees: TOYODA GOSEI CO., LTD., Aichi-pref. (JP); UTSUNOMIYA UNIVERSITY, Tochigi (JP)

( * ) Notice: Subject to any disclaimer, the term of this patent is extended or adjusted under 35 U.S.C. 154(b) by 21 days.

(21) Appl. No.: 16/656,861

(22) Filed: Oct. 18, 2019

(65) Prior Publication Data
US 2020/0124867 A1 Apr. 23, 2020

(30) Foreign Application Priority Data
Oct. 22, 2018 (JP) .............................. JP2018-198599

(51) Int. Cl.
| G02B 30/56 | (2020.01) |
| G02B 5/12 | (2006.01) |
| G06F 3/01 | (2006.01) |
| G02B 27/14 | (2006.01) |

(52) U.S. Cl.
CPC ............... *G02B 30/56* (2020.01); *G02B 5/12* (2013.01); *G02B 27/14* (2013.01); *G06F 3/017* (2013.01)

(58) Field of Classification Search
None
See application file for complete search history.

(56) References Cited

U.S. PATENT DOCUMENTS

| 2015/0120151 A1* | 4/2015 | Akay ..................... B60R 25/24 701/49 |
| 2018/0259616 A1* | 9/2018 | Jo ......................... G01S 17/894 |
| 2018/0284470 A1 | 10/2018 | Yamamoto et al. |

FOREIGN PATENT DOCUMENTS

JP 2017-107165 A 6/2017

* cited by examiner

*Primary Examiner* — Duane N Taylor, Jr.
(74) *Attorney, Agent, or Firm* — Posz Law Group, PLC

(57) ABSTRACT

A noncontact operation detecting device includes a detecting means configured to be able to detect whether or not an object is present at each of a plurality of points to be observed, which are set in a space, an operation decision section configured to determine, on the basis of a detection result detected by the detecting means, whether or not a gesture operation has been performed, and an aerial image displaying device configured to be able to display an aerial image showing locations of the plurality of points to be observed, in the space.

11 Claims, 4 Drawing Sheets

NONCONTACT OPERATION DETECTING DEVICE

BACKGROUND OF THE INVENTION

1. Field of the Invention

The present invention relates to a noncontact operation detecting device, and a method of noncontactly detecting operation.

2. Description of the Related Art

In recent years, gesture operations to perform various functions have been researched. As a noncontact operation detecting device to detect the gesture operations, a device has been developed which detects whether or not an object is present at each of a plurality of points to be observed that are set in a space, and which, for example, when having detected the presence of the object in a predetermined sequential order, executes a function such as a lock releasing function or the like.

Note that patent document 1 has been disclosed as prior art document information relevant to the invention of the present application.

[Patent Document 1] JP-A-2017-107165

SUMMARY OF THE INVENTION

In the above-described conventional noncontact operation detecting device, because it is difficult for a user to recognize which positions in the space are the points to be observed, there is a possibility of such a failure occurring that the user performs the gesture operations at positions away from the set points to be observed, which leads to no recognition of those gesture operations.

An object of the present invention is to provide a noncontact operation detecting device, and a method of noncontactly detecting operation that is easier to use for users.

For the purpose of achieving the above object, one aspect of the present invention provides noncontact operation detecting devices defined by [1] to [14] below.

[1] A noncontact operation detecting device, comprising: a detecting means configured to be able to detect whether or not an object is present at each of a plurality of points to be observed, which are set in a space; an operation decision section configured to determine, on the basis of a detection result detected by the detecting means, whether or not a gesture operation has been performed; and an aerial image displaying device configured to be able to display an aerial image showing locations of the plurality of points to be observed, in the space.

[2] The noncontact operation detecting device as defined by [1] above, wherein the aerial image displaying device comprises: a light source; a retroreflecting member to retroreflect light incident thereon; and a light splitting member to allow at least one part of light emitted from the light source to be reflected and incident on the retroreflecting member, and at least one part of the light incident thereon retroreflected by the retroreflecting member to be transmitted, wherein the aerial image displaying device is being configured in such a manner that the light retroreflected by the retroreflecting member and transmitted through the light splitting member forms an image of the light source in air.

[3] The noncontact operation detecting device as defined by [2] above, wherein the detecting means includes a photodiode, which is provided in the light source to detect light having returned from the plurality of points to be observed.

[4] The noncontact operation detecting device as defined by [2] above, wherein the detecting means includes a detectable light source, which is provided in the light source to emit infrared light, and a photodiode, which is provided in the light source to detect the infrared light having returned from the plurality of points to be observed.

[5] The noncontact operation detecting device as defined by [3] above, wherein the detecting means includes a detectable light source, which is provided in the light source to emit infrared light, and a photodiode, which is provided in the light source to detect the infrared light having returned from the plurality of points to be observed.

[6] The noncontact operation detecting device as defined by [1] above, wherein the aerial image displaying device is being configured in such a manner as to be attached to a vehicle body of a vehicle, and form an image of the light source to an exterior side of the vehicle body.

[7] The noncontact operation detecting device as defined by [2] above, wherein the aerial image displaying device is being configured in such a manner as to be attached to a vehicle body of a vehicle, and form an image of the light source to an exterior side of the vehicle body.

[8] The noncontact operation detecting device as defined by [3] above, wherein the aerial image displaying device is being configured in such a manner as to be attached to a vehicle body of a vehicle, and form an image of the light source to an exterior side of the vehicle body.

[9] The noncontact operation detecting device as defined by [4] above, wherein the aerial image displaying device is being configured in such a manner as to be attached to a vehicle body of a vehicle, and form an image of the light source to an exterior side of the vehicle body.

[10] A method of noncontactly detecting operation, comprising steps of:
detecting whether or not an object is present at each of a plurality of points to be observed, the plurality of points being set in a space;
determining whether or not a gesture operation has been performed, on the basis of a detection result in the step of detecting; and
displaying an aerial image showing locations of the plurality of points.

[11] The method of noncontactly detecting operation as defined by [10] above, wherein the step of displaying the aerial image, comprises steps of:
providing a light source;
retroreflecting light incident on a retroreflecting member; and
providing a light splitting member to allow at least one part of light emitted from the light source to be reflected and incident on the retroreflecting member, and at least one part of the light incident thereon and retroreflected by the retroreflecting member to be transmitted, thereby forming an image of the light source in air in accordance with the light retroreflected by the retroreflecting member and transmitted through the light splitting member.

[12] The method of noncontactly detecting as defined by [10] above, wherein the step of detecting, comprises a step of:
providing a photodiode in the light source for detecting light having returned from the plurality of points to be observed.

[13] The method of noncontactly detecting operation as defined by [10] above, wherein the step of detecting, comprises steps of:

providing a detectable light source in the light source for emitting an infrared light, and providing a photodiode in the light source for detecting an infrared light having returned from the plurality of points to be observed.

[14] The method of noncontactly detecting operation as defined by [10] above, wherein the step of displaying the aerial image, comprises steps of:

attaching an aerial image displaying device on an exterior side of a vehicle body; and forming an image of the light source on the exterior side of the vehicle body.

POINTS OF THE INVENTION

According to the present invention, it is possible to provide the noncontact operation detecting devices that are easier to use for users.

DETAILED DESCRIPTION OF THE PREFERRED EMBODIMENTS

Embodiment

An embodiment of the present invention will be described below in conjunction with the attached drawings.

Figure 1A:
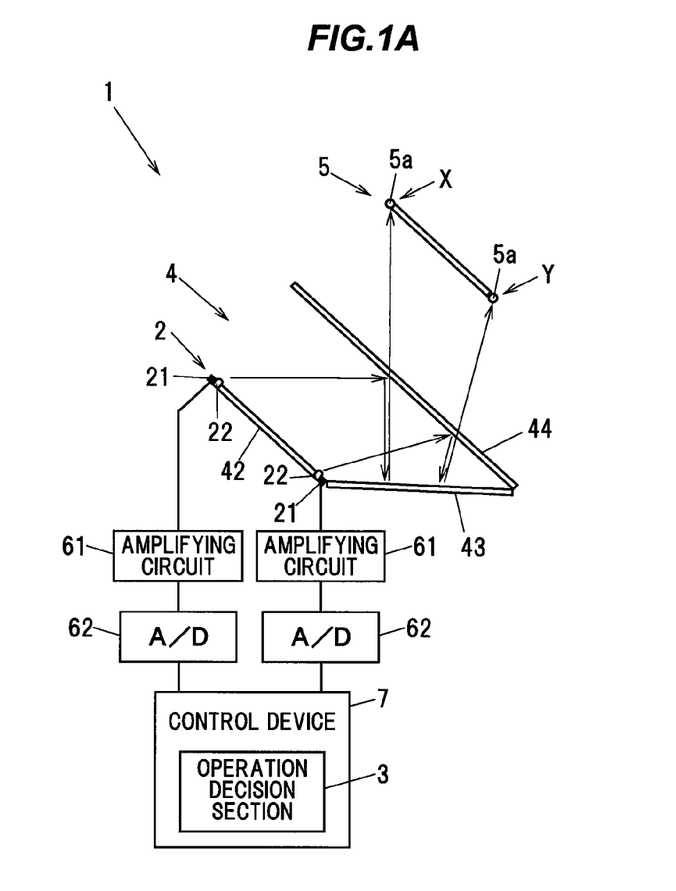
FIG. 1A is a schematic configuration diagram of a non-contact operation detecting device according to one embodiment of the present invention.
Figure 1B:
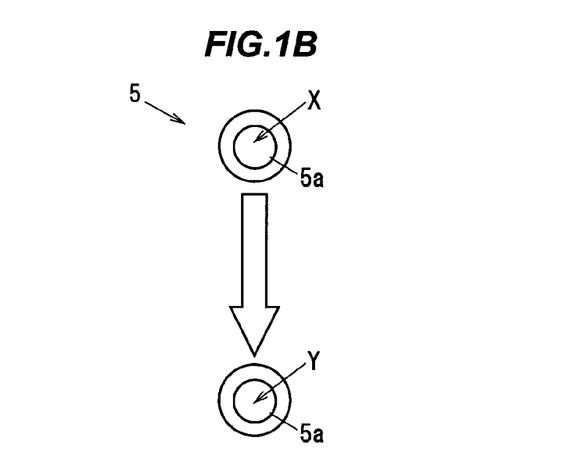
FIG. 1B is an explanatory diagram showing one example of an aerial image.

FIG. 1A is a schematic configuration view of a noncontact operation detecting device according to the present embodiment, and FIG. 1B is an explanatory diagram showing one example of an aerial image. As shown in FIGS. 1A and 1B, the noncontact operation detecting device 1 is being configured to include a detecting means 2, which is being configured to be able to detect whether or not an object is present at each of a plurality of points X and Y to be observed, which are set in a space, an operation decision section 3, which is being configured to determine, on the basis of a detection result detected by the detecting means 2, whether or not a gesture operation has been performed, and an aerial image displaying device 4, which is being configured to be able to display an aerial image 5 showing locations of the plurality of points X and Y to be observed, in the space. Note that the plurality of points X and Y to be observed may not be points, but predetermined regions in air.

(Aerial Image Displaying Device 4)

First, the aerial image displaying device 4 will be described. The aerial image displaying device 4 is being configured to include a light source 42, a retroreflecting member (a retroreflector) 43, and a light splitting member (a beam splitter) 44.

As the light source 42, it is possible to use a plate-like shape displaying member with a plurality of LEDs (light emitting diodes) being arrayed thereon, or the like, for example. Further, as the light source 42, it is also possible to use a light source including one or more LEDs, and a diffusing material that diffuses light emitted from those LEDs, for example. Furthermore, as the light source 42, it is also possible to use a display (a displaying member) such as a liquid crystal display or the like.

The retroreflecting member 43 is being configured as a member that performs such a retroreflection as to reflect back light incident thereon along a direction parallel but opposite to a direction of incidence. As the retroreflecting member 43, it is possible to use a retroreflecting sheet formed in a sheet shape. As the retroreflecting member 43, it is typically possible to use the retroreflecting member having a structure being generally used, such as that using a glass bead or that using a prism.

The light splitting member 44 is being formed in a plate-like shape, and being designed to reflect a part of light incident thereon, while transmitting the remaining part thereof. As the light splitting member 44, it is possible to use a half mirror. Note that the light splitting member 44 is not limited to the above mentioned half mirror, but that it is possible to use the light splitting member being generally termed a beam splitter, as well as a plate-like shape member made of an acrylic or a glass, a plate having an opening array such as a punching metal or the like, a wire grid film, or a reflecting polarizing film.

The light splitting member 44 is being configured to allow at least one part of the light emitted from the light source 42 to be reflected and incident on the retroreflecting member 43, and at least one part of the light incident thereon retroreflected by the retroreflecting member 43 to be transmitted. This makes it possible for the light retroreflected by the retroreflecting member 43 and transmitted through the light splitting member 44 to form an image of the light source 42 in air. This image of the light source 42 imaged in the air is the aerial image 5 in the present invention.

The aerial image displaying device 4 is being configured to display, as the aerial image 5, an image showing the locations of the plurality of points X and Y to be observed. As shown in FIG. 1B, the aerial image 5 acts to visually show a user how to perform the gesture operation. The illustrated example shows such a case that the gesture operation is to be performed by moving a hand of the user from the upper observed point X to the lower observed point Y.

By configuring the aerial image displaying device 4 to display the image showing the locations of the plurality of points X and Y to be observed, it is possible for the user to fully recognize the plurality of points X and Y to be observed, and perform the gesture operation. As a result, it is possible to prevent the user from performing the gesture operation at positions away from the set points to be observed, and thereby allow the user to easily perform the correct gesture operation.

(Detecting Means 2)

The detecting means 2 is being designed to detect whether or not an object (for example, a hand of the user) is present at each of the points X and Y to be observed. In the present embodiment, the detecting means 2 is being built in the light source 42 of the aerial image displaying device 4.

More specifically, the detecting means 2 is being configured to include two photodiodes 21, which are being provided in the light source 42 to detect the light having returned from the points X and Y, respectively, to be observed. In the present embodiment, the detecting means 2 is being configured to include a first photodiode 21a, which is being configured to detect the light having returned from the point X to be observed, and a second photodiode 21b, which is being configured to detect the light having returned from the point Y to be observed.

When an object such as a hand of the user or the like is located at the point X to be observed, the light reflected off the object propagates in the opposite direction to the traveling direction of the light forming the aerial image 5. For example, a part of the light reflected by the object at the point X to be observed is transmitted through the light splitting member 44 and retroreflected by the retroreflecting member 43, and a part of that retroreflected light is further reflected by the light splitting member 44 and exits to a light source 42 side. Since the first photodiode 21a is being arranged in such a location in the light source 42 as to be associated with that of the point X to be observed, the light reflected by the object at the point X to be observed is received in the first photodiode 21a. Accordingly, by detecting an intensity of the received light (an electric current to be detected) in the first photodiode 21a, it is possible to detect whether the object is present at the point X to be observed.

The photodiodes 21 may be designed to detect visible light, but in that case, they are easily affected by ambient brightness, which may lead to a lowering in detection accuracy. For the purpose of avoiding this, in the present embodiment, two detectable light sources 22 (in the present embodiment, also referred to as first and second detectable light sources 22) that emit infrared light are being provided in the light source 42, so that the light having returned from the points X and Y to be observed are detected in the photodiodes 21, respectively. This makes the photodiodes 21 substantially unaffected by the ambient brightness and the like, resulting in an enhancement in the detection accuracy in the photodiodes 21.

For the purpose of increasing the amounts of the returned light received in the photodiodes 21, the first photodiode 21 and the first detectable light source 22 may be arranged as adjacent to each other as possible, and the second photodiode 21 and the second detectable light source 22 may be arranged as adjacent to each other as possible. The first photodiode 21 and the first detectable light source 22 are being arranged in the location in the light source 42 that is associated with that of the point X to be observed, while the second photodiode 21 and the second detectable light source 22 are being arranged in the location in the light source 42 that is associated with that of the point Y to be observed. The infrared light rays emitted from the detectable light sources 22 form images of positions 5a, respectively, in the aerial image 5 that correspond to the points X and Y, respectively, to be observed. Herein, the first photodiode 21 and the first detectable light source 22 are being arranged in one edge section (an upper end section) of the light source 42, while the second photodiode 21 and the second detectable light source 22 are being arranged in an other edge section (a lower end section) of the light source 42. It should be noted, however, that the locations to arrange the photodiodes 21 and the detectable light sources 22 can appropriately be altered according to the locations of the settable points X and Y to be observed.

Although in the present embodiment, the photodiodes 21 and the detectable light sources 22 are being provided for each of the plurality of points X and Y to be observed, and the same numbers of the photodiodes 21 and the detectable light sources 22 as the number of the points X and Y to be observed are being used, the number of the photodiodes 21 and the number of the detectable light sources 22 are not limited to the above numbers, but it is possible to use one detectable light source 22 for the plurality of points X and Y to be observed, or it is also possible to use one photodiode 21 for the plurality of points X and Y to be observed. For instance, as shown in FIG. 2B, the detecting means 2 may be configured in such a manner as to provide one detectable light source 22 in a halfway location between the positions in the light source 42 that are associated with the locations of the points X and Y, respectively, to be observed, and in such a manner as to provide an infrared light diffusing material 23 that covers that one detectable light source 22, to allow the diffused infrared light rays emitted from that one detectable light source 22 to arrive at both the points X and Y to be observed. In this case, the two photodiodes 21 are being arranged in the locations in the light source 42 that are associated with the locations of the points X and Y, respectively, to be observed.

Figure 2A:
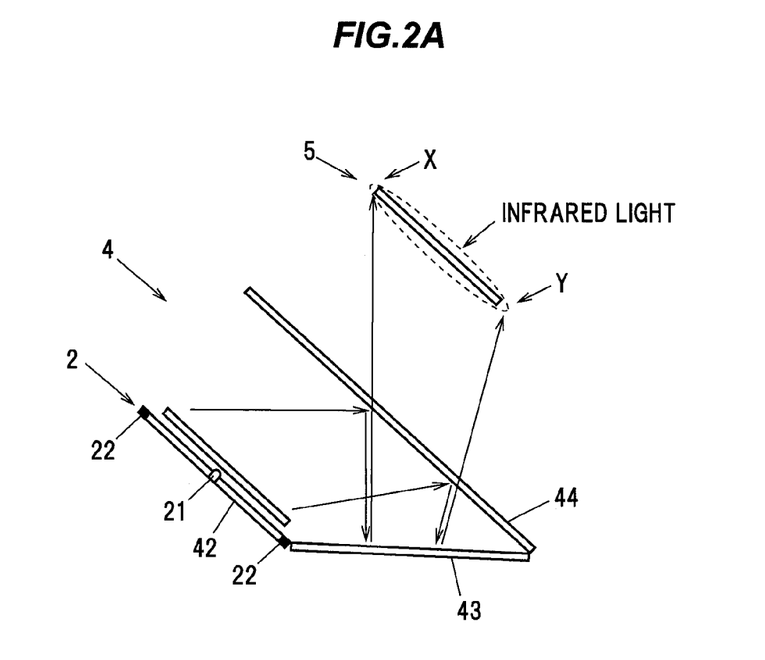
FIG. 2A is a schematic configuration diagram showing a noncontact operation detecting device according to one modification to the present invention.
Figure 2B:
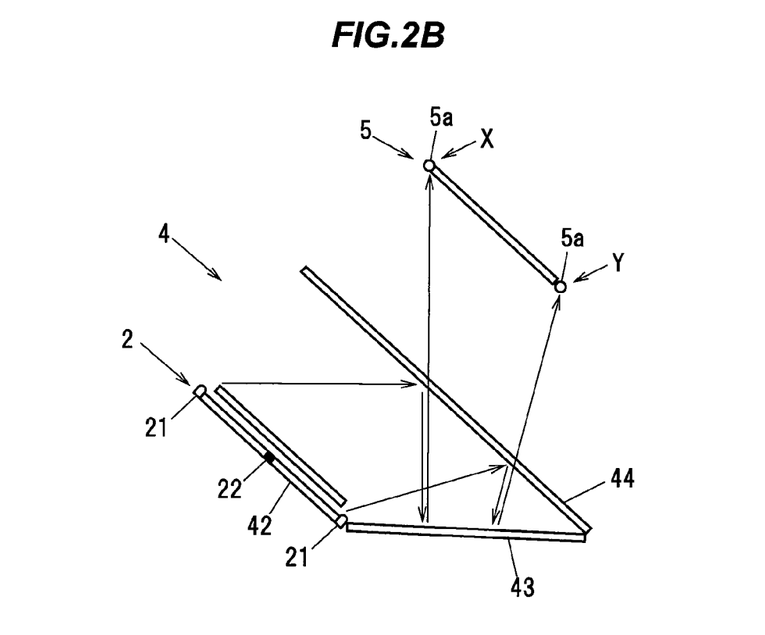
FIG. 2B is a schematic configuration diagram showing a noncontact operation detecting device according to one modification to the present invention.

Further, as shown in FIG. 2A, the detecting means 2 can be configured in such a manner as to use one photodiode 21 to detect the light rays having returned from the plurality of points X and Y to be observed. In this case, one photodiode 21 is being provided in a halfway location between the positions in the light source 42 that are associated with the locations of the points X and Y, respectively, to be observed, and the diffusing material 23 is being provided in such a manner as to cover that one photodiode 21. Further, the two detectable light sources 22 are being arranged in the locations in the light source 42 that are associated with the locations of the points X and Y, respectively, to be observed. It is desirable that the diffusing material 23 is being extended up to regions adjacent to each of the two detectable light sources 22. In the case of FIG. 2A, the two detectable light sources 22 are alternately switched on in a predetermined time cycle (for example, a cycle of on the order of several kHz). For example, if the received light intensity of the photodiode 21 becomes high while the detectable light source 22 associated with the point X to be observed is being switched on, it is then found that the object is present at the point X to be observed.

(Operation Decision Section 3)

Returning to FIG. 1A, the detected electric currents from both the photodiodes 21a and 21b are converted by their associated current-voltage conversion circuits (not shown) into voltage signals respectively, which are amplified by their associated amplification circuits 61 respectively, and converted by their associated analog-digital conversion circuits 62 into digital signals respectively, which are input to a control device 7.

The control device 7 is being mounted with the operation decision section 3 configured to determine whether or not a gesture operation has been performed. The operation decision section 3 is being configured by appropriately combining a computing element such as a CPU and the like, a memory, an interface, a software, and the like.

In the present embodiment, the operation decision section 3 is being configured to determine, on the basis of the detected electric currents input from the photodiodes 21a and 21b, whether or not the gesture operation has been performed. The operation decision section 3, when the detected electric currents from the photodiodes 21a and 21b are equal to or higher than a predetermined threshold value, acts to make such a decision that the object such as a hand of the user or the like is present at the observed points X and Y associated with the photodiodes 21a and 21b respectively. In the present embodiment, the operation decision section 3 is being configured in such a manner that, when the operation decision section 3 makes such a first decision that the object is present at the observed point X, and makes such a second decision that the object is present at the observed point Y within a predetermined time from a time of having made the first decision, the operation decision section 3 makes such a final decision that the gesture operation has been performed, and executes a predetermined function such as a lock releasing function or the like.

Figure 3:
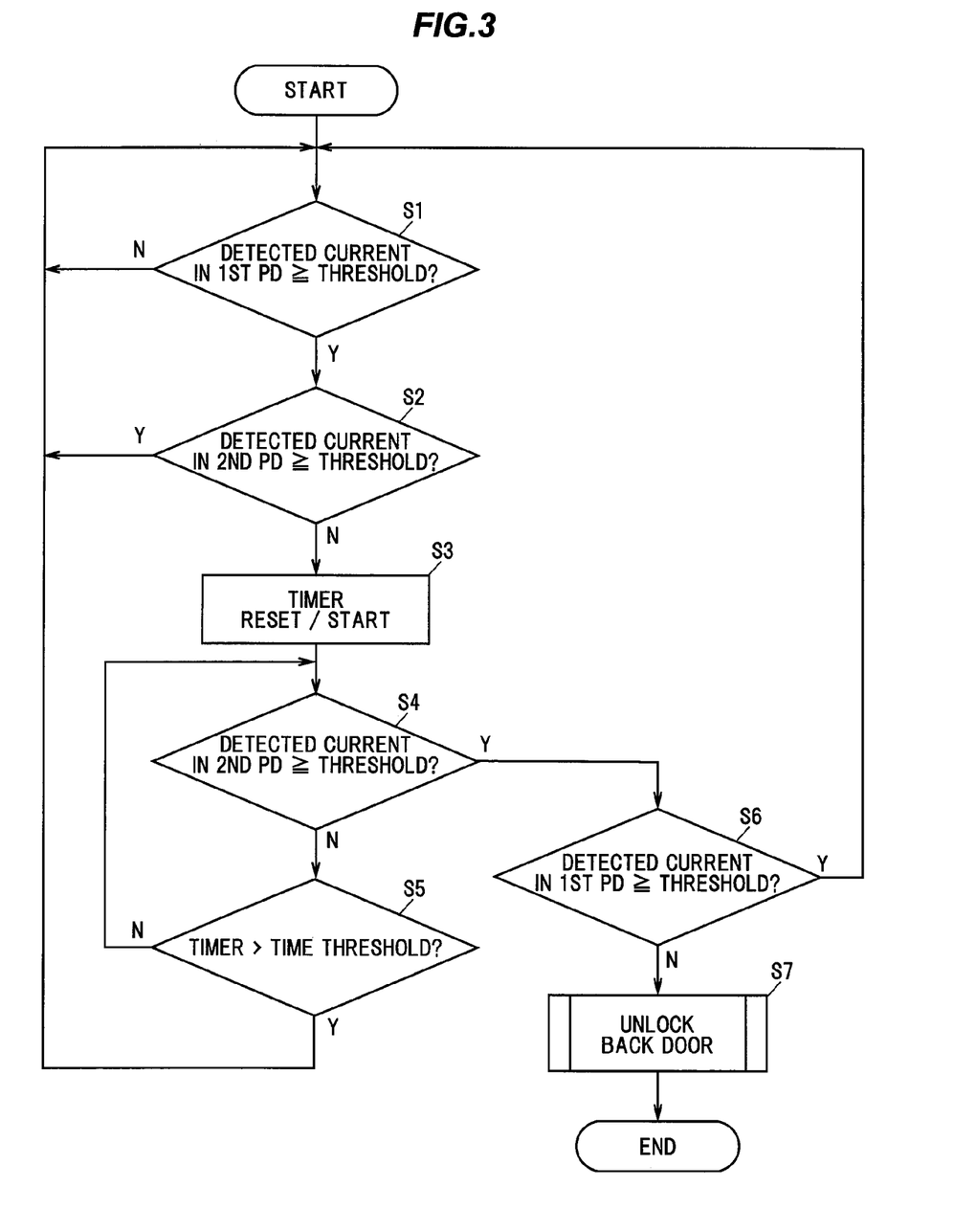
FIG. 3 is a flow chart showing one example of a control flow in an operation decision section.

FIG. 3 is a flow chart showing one example of a control flow in the operation decision section 3. Herein, as one example, such a case will be described that the operation decision section 3, when having made such a decision that a gesture operation has been performed, releases a lock of a back door 12 (see FIGS. 4A and 4B) of a vehicle 10.

As shown in FIG. 3, in step S1, the operation decision section 3 first makes a decision as to whether a detected electric current in the first photodiode 21a is equal to or higher than a predetermined threshold value. If a No decision is made in step S1, then the process returns to step S1. If a Yes decision is made in step S1, then in step S2 the operation decision section 3 makes a decision as to whether a detected electric current in the second photodiode 21b is equal to or higher than a predetermined threshold value. If a Yes decision is made in step S2, then an object is present at both the points X and Y to be observed, so the operation decision section 3 makes such a decision that no gesture operation has been performed, and the process returns to step S1. If a No decision is made in step S2, the process progresses to step S3.

In step S3, the operation decision section 3 resets and starts a timer. In step S4, the operation decision section 3 makes a decision as to whether a detected electric current in the second photodiode 21b is equal to or higher than a predetermined threshold value. If a No decision is made in step S4, then in step S5 the operation decision section 3 makes a decision as to whether a time in the timer is longer than a predetermined time threshold value. If a No decision is made in step S5, then the process returns to step S4, or if a Yes decision is made in step S5, then the process returns to step S1.

If a Yes decision is made in step S4, in other words, if the operation decision section 3 makes such a decision that an object is present at the point Y to be observed within a predetermined time from a time of having made such a decision that an object is present at the point X to be observed, then the process progresses to step S6. In step S6, the operation decision section 3 makes a decision as to whether a detected electric current in the first photodiode 21a is equal to or higher than a predetermined threshold value. If a Yes decision is made in step S6, then an object is present simultaneously at the points X and Y to be observed, so the operation decision section 3 makes such a decision that no gesture operation has been performed, and the process returns to step S1.

If a No decision is made in step S6, then the operation decision section 3 makes such a decision that the gesture operation has been performed, and in step S7 the operation decision part 3 releases a lock of a back door 12 (see FIGS. 4A and 4B) of a vehicle 10, and ends the process.

(Application to a Vehicle 10)

Figure 4A:
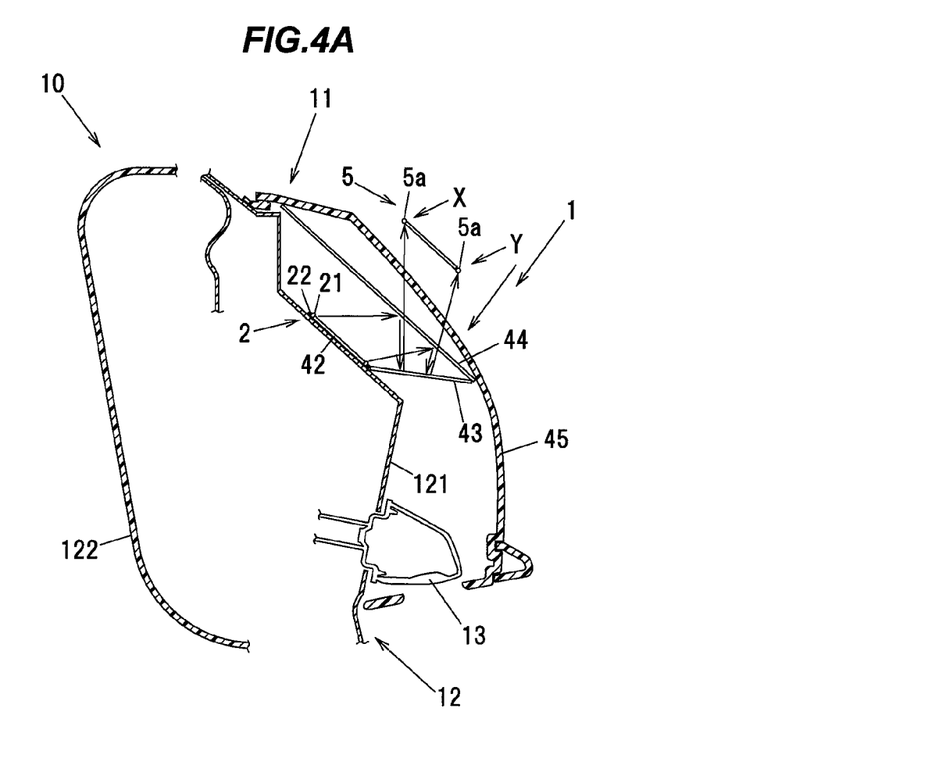
FIG. 4A is a schematic configuration diagram showing the noncontact operation detecting device of FIG. 1 when attached to a vehicle.
Figure 4B:
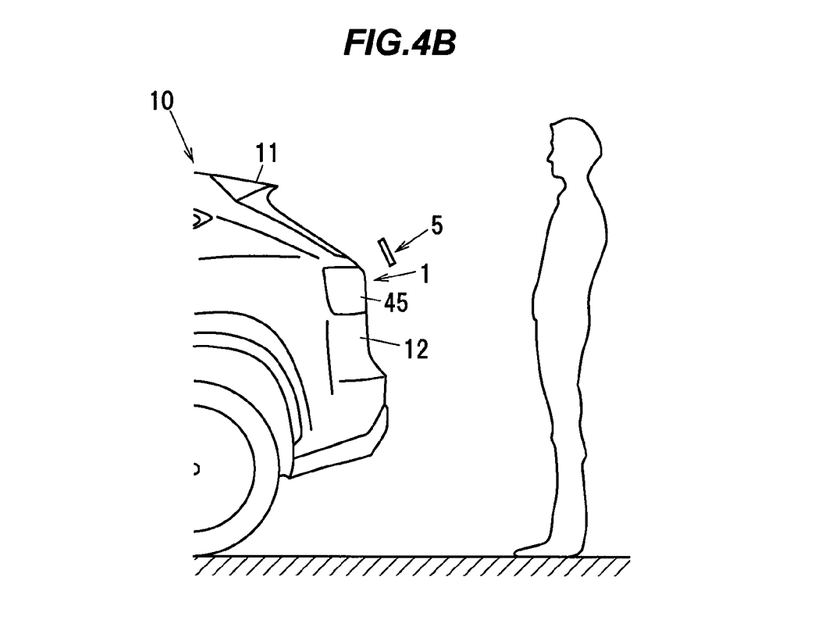
FIG. 4B is a diagram showing one example of a displaying of an aerial image to an exterior side of a vehicle body.

FIG. 4A is a schematic configuration diagram showing the noncontact operation detecting device 1 of FIG. 1 when attached to a vehicle 10, and FIG. 4B is a diagram showing one example of a displaying of the aerial image 5 to an exterior side of a vehicle body 11. As shown to FIG. 4A and FIG. 4B, the aerial image displaying device 4 is being configured in such a manner as to be attached to a vehicle body 11 of a vehicle 10, and form the aerial image 5 to an exterior side of the vehicle body 11 of the vehicle 10. In the noncontact operation detecting device 1 according to the present embodiment, the aerial image displaying device 4 is being configured in such a manner as to be provided on a back door (a rear hatch) 12 of the vehicle 10, and form the aerial image 5 to a rear side of the back door 12.

In the noncontact operation detecting device 1, the light source 42 is being provided on an outer surface of a sheet metal 121 on an outer side of the back door 12, and the light source 42 is being provided in such a manner that an optical axis of the light source 42 is oriented to a rear and upper side (an oblique upper direction) of the vehicle 10. The light splitting member 44 is being provided in such a manner as to be located opposite the light source 42. The retroreflecting member 43 is being arranged in such a manner as to be located on a rear and lower side of the light source 42 and opposite the light splitting member 44, and the retroreflecting member 43 is being arranged in such a manner that a tilted angle of the retroreflecting member 43 with respect to a horizontal direction is smaller than that of the light splitting member 44.

A rear side of the light splitting member 44 is being covered with a resin cover 45. A part of the cover 45 which serves to allow passage of the light that is retroreflected by the retroreflecting member 43 and transmitted through the light splitting member 44 to form the aerial image 5 is made of a member that transmits at least a part of that light. In the present embodiment, the cover 45 also serves to cover a number plate light 13 for illuminating a number plate (not shown). The retroreflecting member 43 is being provided in such a manner as to shut a space between the sheet metal 121 and the cover 45 for the purpose of intercepting the light from the number plate light 13. Note that the retroreflecting member 43 is being configured in such a manner as to allow a retroreflection at a front surface (upper surface in the drawing) of the retroreflecting member 43, and that a back surface (lower surface in the drawing) of the retroreflecting member 43 is made of such a member (such as a black resin layer or the like) as to be able to intercept the light from the number plate light 13. Note that reference numeral 122 in FIG. 4A denotes an interior trim panel of the back door 12.

In the present embodiment, the light to form the aerial image 5 is transmitted through the curved cover 45, which may therefore lead to a distortion of the aerial image 5 due to the influence of the cover 45. For the purpose of avoiding this, a cover distortion correcting means may be further provided that corrects the distortion of the aerial image 5 due to the influence of the cover 45. As the cover distortion correcting means, it is possible to mention the following: arranging such a member (made of the same material as that of the cover 45 and having a reversed cover 45 shape) as to be able to correct the image distortion due to the cover 45 between the light source 42 and the light splitting member 44; altering the image itself of the original light source 42 so that the intended aerial image 5 can be obtained by distortion due to the influence of the cover 45, or the like, for example.

(Modifications)

Although in the present embodiment such a case that the detecting means 2 is being built in the light source 42 of the aerial image displaying device 4 has been described, the configuration of the detecting means 2 is not limited to this case, but the detecting means 2 may instead be configured in such a manner as to use a camera, an ultrasonic sensor and the like provided separately from the aerial image displaying device 4, to detect whether an object is present at the points X and Y to be observed, for example. It should be noted, however, that because, in this case, there are an increase in the number of parts, and a need for an image processing device and the like, leading to an increase in device complexity, and an increase in cost as well, it can be said that it is more desirable to employ such a configuration that the photodiode 21 is built in the light source 42, as in the present embodiment.

In addition, the light source 42 (including the photodiodes 21 and the detectable light sources 22), the retroreflecting member 43, and the light splitting member 44 may integrally be provided by molding with a molding member. This makes it possible to suppress the occurrence of a relative positional misalignment of each member due to a vibration, and thereby makes it possible to suppress the occurrence of such a failure as a distortion and the like of the aerial image 5 due to the positional misalignment of each member. As the molding member, a member that is transparent (high in transmittance) to the light emitted by the light source 42 (and the detectable light sources 22) may be used, and for example, an acrylic resin, an epoxy resin, a silicone resin or the like can be used. As the molding member other than those resins, an inorganic transparent material can also be used, and a glass or the like can be used.

(Operations and Advantageous Effects of the Embodiment)

As described above, the noncontact operation detecting device 1 according to the present embodiment is being configured to include the detecting means 2 configured to be able to detect whether or not an object is present at each of the plurality of points X and Y to be observed, which are set in the space, the operation decision section 3 configured to determine, on the basis of a detection result detected by the detecting means 2, whether or not a gesture operation has been performed, and the aerial image displaying device 4 configured to be able to display the aerial image 5 showing the locations of the plurality of points X and Y to be observed, in the space.

By showing the locations of the plurality of points X and Y to be observed with the aerial image 5, it is possible for the user to fully recognize the plurality of points X and Y to be observed, and perform the gesture operation, and it is therefore possible to achieve the noncontact operation detecting device 1 that is easier to use for users.

Although the embodiments and examples of the present invention have been described above, the present invention is not limited to the above-described embodiments and examples, but various modifications can be carried out without departing from the spirit of the invention.

For example, although such a case that the noncontact operation detecting device 1 is provided in the back door 12 of the vehicle 10 has been described in the above embodiments, the location to install the noncontact operation detecting device 1 is not limited thereto. In addition, the noncontact operation detecting device 1 is also applicable to a machine other than the vehicle 10.

Further, the embodiments and the examples described above are not to be construed as limiting the inventions according to the claims. It should also be noted that not all combinations of the features described in the embodiments and the examples are indispensable to the means for solving the problem of the invention.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

DESCRIPTIONS OF THE REFERENCE CHARACTERS

1 Noncontact operation detecting device
2 Detecting means
21 Photodiode
22 Detectable light source
3 Operation decision section
4 Aerial image displaying device
42 Light source
43 Retroreflecting member
44 Light splitting member
5 Aerial image
10 Vehicle
11 Vehicle body

What is claimed is:

1. A noncontact operation detecting device, comprising:
a detecting means, having at least one photodiode, configured to be able to detect whether or not an object is present at each of a plurality of points to be observed, which are set in a space;
a processor and a memory, the processor is configured to determine, on the basis of a detection result detected by the detecting means, whether or not a gesture operation has been performed; and
an aerial image displaying device configured to be able to display an aerial image showing locations of the plurality of points to be observed, in the space, wherein the aerial image displaying device comprises a light source,
wherein the at least one photodiode is provided in the light source to detect light having returned from the plurality of points to be observed.

2. The noncontact operation detecting device according to claim 1, wherein the aerial image displaying device comprises:
a retroreflecting member to retroreflect light incident thereon; and
a light splitting member to allow at least one part of light emitted from the light source to be reflected and incident on the retroreflecting member, and at least one part of the light incident thereon retroreflected by the retroreflecting member to be transmitted,
wherein the aerial image displaying device is being configured in such a manner that the light retroreflected by the retroreflecting member and transmitted through the light splitting member forms an image of the light source in air.

3. The noncontact operation detecting device according to claim 2, wherein the detecting means further includes a detectable light source, which is provided in the light source to emit infrared light, and the at least one photodiode, which is provided in the light source to detect the infrared light having returned from the plurality of points to be observed.

4. The noncontact operation detecting device according to claim 1, wherein the aerial image displaying device is being configured in such a manner as to be attached to a vehicle body of a vehicle, and form an image of the light source to an exterior side of the vehicle body.

5. The noncontact operation detecting device according to claim 2, wherein the aerial image displaying device is being configured in such a manner as to be attached to a vehicle body of a vehicle, and form an image of the light source to an exterior side of the vehicle body.

6. The noncontact operation detecting device according to claim 3, wherein the aerial image displaying device is being configured in such a manner as to be attached to a vehicle body of a vehicle, and form an image of the light source to an exterior side of the vehicle body.

7. A method of noncontactly detecting operation, comprising steps of:
    detecting whether or not an object is present at each of a plurality of points to be observed, the plurality of points being set in a space;
    determining whether or not a gesture operation has been performed, on the basis of a detection result in the step of detecting; and
    displaying an aerial image showing locations of the plurality of points.

8. The method of noncontactly detecting operation according to claim 7, wherein the step of displaying the aerial image, comprises steps of:
    providing a light source;
    retroreflecting light incident on a retroreflecting member; and
    providing a light splitting member to allow at least one part of light emitted from the light source to be reflected and incident on the retroreflecting member, and at least one part of the light incident thereon and retroreflected by the retroreflecting member to be transmitted, thereby forming an image of the light source in air in accordance with the light retroreflected by the retroreflecting member and transmitted through the light splitting member.

9. The method of noncontactly detecting operation according to claim 7, wherein the step of detecting, comprises a step of:
    providing a photodiode in the light source for detecting light having returned from the plurality of points to be observed.

10. The method of noncontactly detecting operation according to claim 7, wherein the step of detecting, comprises steps of:
    providing a detectable light source in the light source for emitting an infrared light, and
    providing a photodiode in the light source for detecting an infrared light having returned from the plurality of points to be observed.

11. The method of noncontactly detecting operation according to claim 7, wherein the step of displaying the aerial image, comprises steps of:
    attaching an aerial image displaying device on an exterior side of a vehicle body; and
    forming an image of the light source on the exterior side of the vehicle body.

* * * * *